E. H. LAYMAN.
SPRING TIRE.
APPLICATION FILED AUG. 23, 1911.
1,067,353.
Patented July 15, 1913.
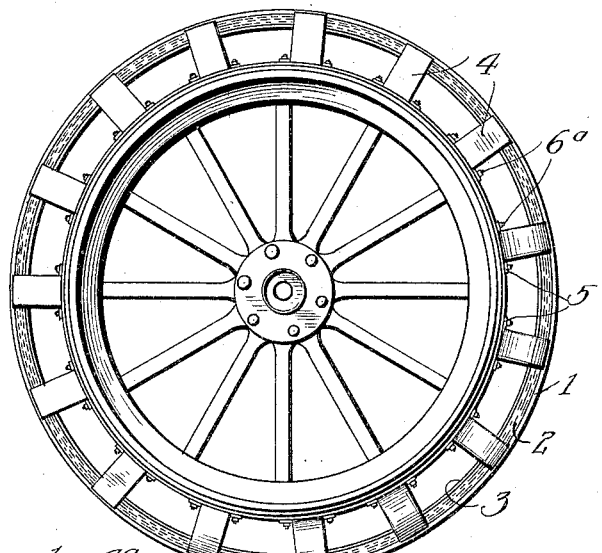
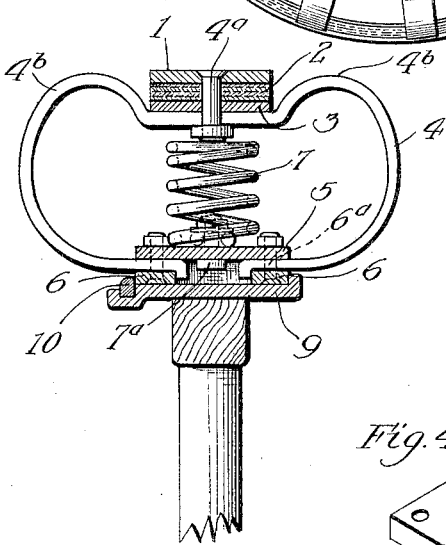
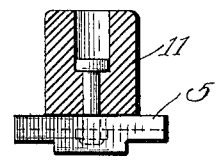
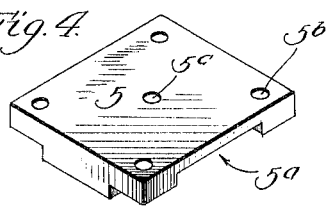
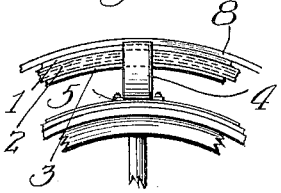
WITNESSES:
George J. Huting.
Mary G. Bowman
INVENTOR.
Estes, H. Layman.
BY
A. B. Bowman
ATTORNEY.

UNITED STATES PATENT OFFICE.

ESTES H. LAYMAN, OF PACIFIC BEACH, CALIFORNIA.

SPRING-TIRE.

1,067,353.

Specification of Letters Patent.

Patented July 15, 1913.

Application filed August 23, 1911. Serial No. 645,574.

*To all whom it may concern:*

Be it known that I, ESTES H. LAYMAN, a citizen of the United States, and a resident of Pacific Beach, in the county of San Diego and State of California, have invented certain new and useful Improvements in Spring-Tires, of which the following is a specification.

My invention relates to improvements in elastic tires, for the wheels of automobiles, and other vehicles, and the object of my invention is to provide a simple, inexpensive and efficient vehicle tire, which, on account of its elasticity will relieve the jar to the body of the vehicle, is not liable to punctures and may be readily attached to and detached from the standard wheel rim.

With these and other objects in view as will appear, my invention consists of certain novel features of construction, combination and arrangement of parts as will be hereinafter described in detail, and particularly set forth in the appended claims, reference being had to the accompanying drawings, and to the characters of reference thereon, which form a part of this specification, in which:—

Figure 1 is a side elevational view of a wheel with my improved tire mounted thereon, Fig. 2 is a sectional view of my tire shown in connection with the rim and a spoke, Fig. 3 is a sectional view showing a slight modification of one element thereof, Fig. 4 is a perspective view in detail, of the spring holding clip, and Fig. 5 is an elevational view of a portion of a wheel showing a portion of the tire provided with a tread surface in a slightly modified form from that shown in Fig. 1.

Similar characters of reference refer to similar parts throughout the several views.

My invention consists of an outside spring ring 1, an annularly shaped cushion, preferably of leather 2, an inner bearing ring 3, a plurality of supporting springs 4, a plurality of supporting spring clip pieces 5, binding rings 6, emergency springs 7, and in its modified form a tread piece 8. This tread is composed of spring rings 1 and 3, between which is placed cushion 2 which is preferably leather, but may be of any flexible material. These three are substantially bolted together by means of bolts 4$^a$ and are supported by means of supporting springs 4, which are shaped as shown best in Fig. 2 so that in case of heavy load or shock, the outer extended portions 4$^b$ of the spring will take a portion of the load. There are a sufficient number of these springs 4 to support the load ordinarily and carry it upon the tread portion. These springs are attached to the rim portion 9 by means of clips 5, which are provided with grooves 5$^a$ adapted for the extended ends of the springs 4. On the inner surface of these extended ends are provided the binding rings 6 which are provided with holes adapted to conform with the holes 5$^b$ in clip 5, into which are inserted counter-sunk bolts 6$^a$ which hold the extended ends of springs 4, and clips 5, thus connecting said parts firmly together. These binding rings 6 are adapted to fit into rim 9 after which retaining ring 10 is placed therein, which provides for readily detaching the tire from the rim.

Centrally mounted on clip 5 and rigidly attached thereto by means of bolt 7$^a$ in hole 5$^c$ is a compression spring 7 which is an emergency spring, only, and is adapted to take the load in case of a shock or heavy load on the tread portion. In case it is desired to use a rubber or elastic bumper piece, I have provided a rubber piece 11, to be used instead of the compression spring 7, which is shown in Fig. 3.

In Fig. 5 the outer piece 8 is leather or other friction producing material, rigidly attached to the tread portion, and it is for the purpose of providing added friction between the wheel and the ground, if desired.

It will be noted here that the spring rings 1 and 3 are sufficiently flexible to spring inwardly with the load which provides an additional contact surface for the tread.

Though I have shown and described a particular form and construction, of tire, I do not wish to be limited to this particular form and construction, but desire to include in my invention, the construction substantially as set forth in the appended claims.

It will be readily seen that there is provided a tire, the tread portion of which is flexible, being composed of flexible material of a suitable thickness and being double and provided with a cushion between the parts provides an added elasticity and strength; that the spring piece 4 provides elasticity between the rim and tread portion, thus adding to the general elasticity of the tire; that the emergency spring or the rubber bumper 11 provides a means to prevent breakage of the tire in case of shocks or heavy loads; that the tire is readily attached to or detached from the standard rim.

Having thus described my invention, what I claim as new and desire to secure by Letters Patent is:—

1. A spring tire, comprising two concentrically disposed spring rings spaced apart, a flexible ring shaped cushion mounted between them, a plurality of supporting spring means adapted to furnish an additional tread surface under certain conditions secured to said rings, two rings spaced apart side by side adapted to fit a standard rim in connection with said springs, a plurality of clips provided with a recess to fit over and bind said spring means to said rings, and a plurality of bumpers rigidly secured to said clips adapted to take the load in case of shocks.

2. A spring tire, comprising two annular binding rings spaced apart to adapt them to fit a standard detachable wheel rim, a plurality of supporting springs so shaped as to adapt them to furnish an additional tread surface under certain conditions, and provided with lugs adapted to fit between said rings, a plurality of clips adapted to fit over said supporting springs provided with bolts connecting said clips, supporting springs and annular rings together, a plurality of elastic bumpers substantially attached to said clips, an inner spring ring bolted to said supporting springs, a cushion on the outer surface thereof, another spring ring mounted on the outer surface of said cushion, and a frictional and wearing piece mounted on the tread or outer surface thereof, substantially attached to said supporting spring.

In testimony whereof, I have hereunto subscribed my name in the presence of two subscribing witnesses.

ESTES H. LAYMAN.

Witnesses:
  ABRAM B. BOWMAN,
  MARY A. BOWMAN.

---

Copies of this patent may be obtained for five cents each, by addressing the "Commissioner of Patents, Washington, D. C."